United States Patent

[11] 3,623,077

[72] Inventor Vernon R. Clark
Bartlesville, Okla.
[21] Appl. No. 867,543
[22] Filed Oct. 20, 1969
[45] Patented Nov. 23, 1971
[73] Assignee Phillips Petroleum Company

[54] DIGITAL-TO-ANALOG CONVERTER
7 Claims, 9 Drawing Figs.

[52] U.S. Cl. 340/347DA, 235/151.1
[51] Int. Cl. H03k 13/02
[50] Field of Search 340/347

[56] References Cited

UNITED STATES PATENTS

| | | | |
|---|---|---|---|
| 3,483,552 | 12/1969 | Millar | 340/347 |
| 3,483,550 | 12/1969 | Max | 340/347 |
| 3,452,258 | 6/1969 | Thompson | 340/347 |
| 3,189,891 | 6/1965 | Karsh | 340/347 |
| 2,970,308 | 1/1961 | Stringfellow | 340/347 |

*Primary Examiner*—Maynard R. Wilbur
*Assistant Examiner*—Jeremiah Glassman
*Attorney*—Young and Quigg

ABSTRACT: Isolation transformers are employed to provide direct current isolation of the analog output signal of a digital-to-analog converter from the digital input signals and from the digital computer power supply. The converter contains buffer storage elements, digital-to-analog switches, and a ladder network to retain the last computer output signal indefinitely in case of computer breakdown or failure of the computer power supply. An analog controller can be employed to provide a continuous correction to the last computer control signal represented by the converter output, in the event the computer fails or is shut down for repair.

INVENTOR.
V. R. CLARK

BY Young & Quigg

ATTORNEYS

INVENTOR.
V. R. CLARK

BY Young & Quigg

ATTORNEYS

INVENTOR.
V. R. CLARK

BY

Young & Quigg

ATTORNEYS

DIGITAL-TO-ANALOG CONVERTER

This invention relates to a digital-to-analog converter. In one of its aspects the invention relates to a DAC which is provided with direct current isolation means. In another aspect the invention relates to means for employing an analog controller to provide a continuous correction signal for the converter output in case of computer failure.

In computer-controlled plant processes, the input signals to the computer control system are analog signals which originate from such devices as temperature- and pressure-measuring instruments and the like. These analog input signals are first converted to digital signals in an analog-to-digital converter for use in a digital computer. Output signals from the digital computer are in digital form and their conversion to analog signals is necessary prior to transmittal to the ultimate analog control means. The final analog signals in electrical form are then usually converted to air pressure signals for actuating the ultimate control means, such as pneumatically operated valves and the like. The computer can employ a plurality of digital-to-analog converters, each capable of operating at process computer speeds with no external buffering and with a minimum of interfacing.

In carrying out the present invention, provision is made to isolate the digital computer from the digital-to-analog converter by use of isolation transformers, and by the use of an independent power supply which powers only the converter. Further improved operation is achieved by digital-to-analog switches powered by the independent power supply to latch in the last converted digital signal in the analog ladder network where it is held for future use should the computer or its power supply fail to operate. This feature allows manual or analog operation of the plant process normally controlled by the computer, should the computer cease to function. An analog controller, having the controlled process variable measurement as an input thereto, can be employed to provide a continuous correction or updating signal to be combined with the retained converter output in the event of computer failure.

Accordingly it is an object of the invention to provide an improved digital-to-analog converter. Another object of the invention is to provide an analog control system as a backup control in the event of computer failure in a digital computer control system. Another object of the invention is to provide direct current isolation of the digital-to-analog converter output signal from the digital input signal and from the computer ground. Yet another object of the invention is to provide means for indicating the last computer output control signal in instances of computer failure. Another object of the invention is to eliminate the drift of the analog control signal produced by the digital-to-analog converter in a computer control system. Other objects, aspects and advantages of the invention will be obvious from a study of the specification, drawings and appended claims to the invention.

In the drawings, FIG. 1 is a diagrammatic representation of a digital computer control system for a plant process;

Figures 1, 2, 4, 5, 6:
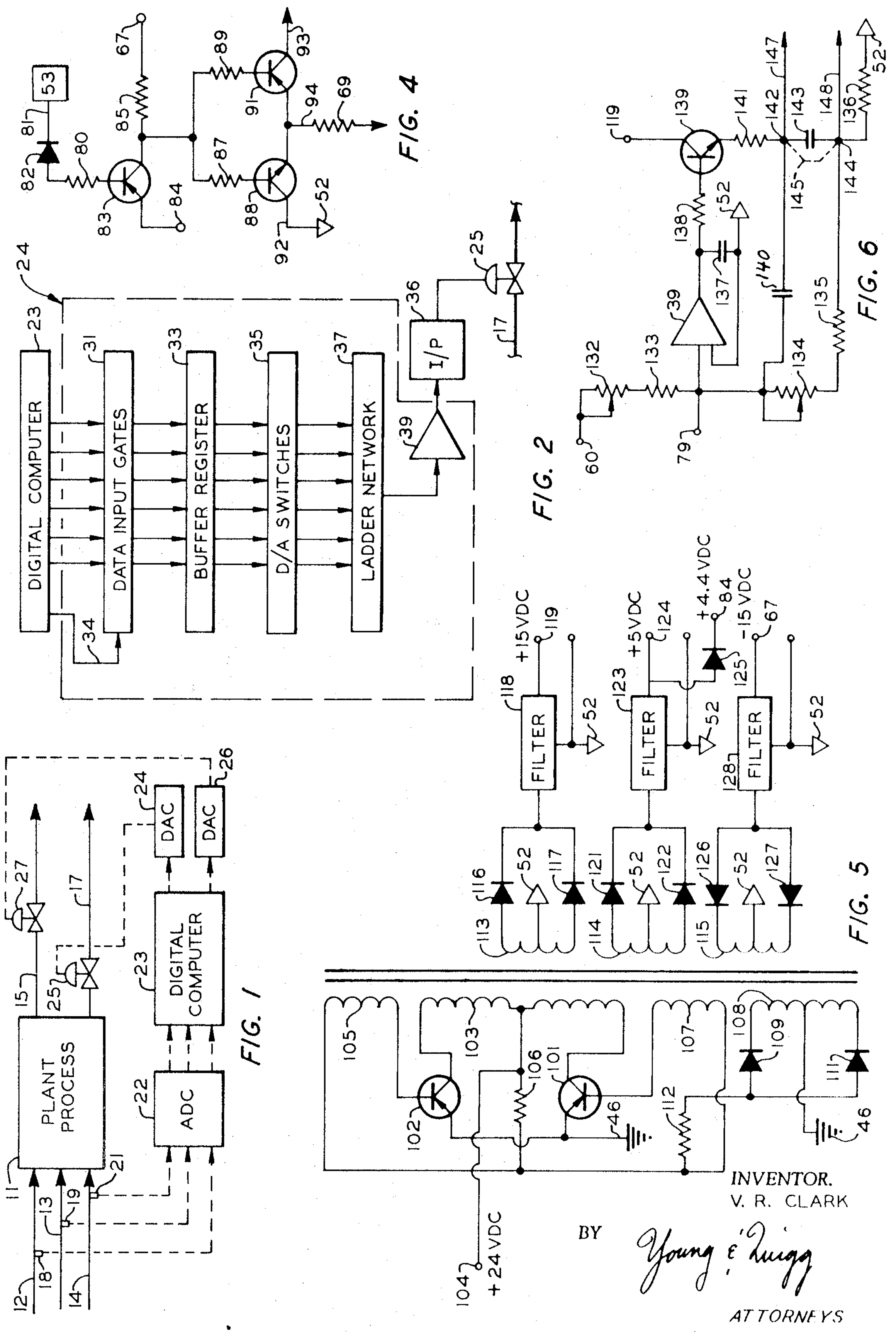
FIG. 2 is a block diagram of the components of one of the digital-to-analog converters in the control system of FIG. 1.
FIG. 4 is a schematic representation of the details of one of the digital-to-analog switches used ahead of the ladder network of FIG. 3.
FIG. 5 is a schematic representation of the direct current power supply for the converter of FIG. 3.
FIG. 6 is a diagrammatic representation of one output arrangement which can be utilized with the circuitry of FIG. 3 to provide either current or voltage output.

Referring now to the drawings, and to FIG. 1 in particular, there is illustrated a plant process 11 having inputs 12, 13 and 14 and having outputs 15 and 17. Inputs 12, 13 and 14 can be such variables as feed composition, catalyst flow rate, feed flow rate, heat input, or the like. Analog-sensing elements 18, 19, and 21 are positioned on inputs 12, 13, and 14, respectively, to measure a characteristic of each variable and to transmit signals representative of the measured characteristics to inputs of analog-to-digital converter 22. Each of the analog input signals to converter 22 is transformed to digital form and applied to an input of digital computer 23. Converter 22 can comprise an individual converter for each input signal or a single converter utilized on a time-sharing basis. Computer 23 utilizes the input signals submitted thereto to produce the desired number of digital output control signals. One of these digital control signals is applied to digital-to-analog converter 24 wherein the signal is transformed into analog form. The analog signal is then applied to valve 25 operatively positioned in output line 17. Similarly, a digital control signal is applied to the input of digital-to-analog converter 26 to transform the digital signal to analog form. This analog signal is then applied to valve 27, which is operatively positioned in output line 17.

Referring now to FIG. 2, digital-to-analog converter 24 is illustrated as comprising data input gates 31, buffer storage register 33, digital-to-analog switches 35, ladder network 37, and output amplifier 39. The digital control signal is applied in parallel form to individual inputs of data input gates 31 whenever computer 23 transmits the appropriate address signal 34. The digital signal is transmitted from gates 31 in parallel form to buffer storage register 33. The individual outputs of register 33 are applied to respective inputs of the digital-to-analog switches 35. Switches 35 control the application of an analog voltage to various points in ladder network 37 to produce an analog control signal which is applied to the input of amplifier 39. Where valve 25 is a pneumatically actuated valve, the output of amplifier 39 can be applied to the input of current-to-pneumatic transducer 36, with the output of transducer 36 being applied to valve 25.

Figure 3:
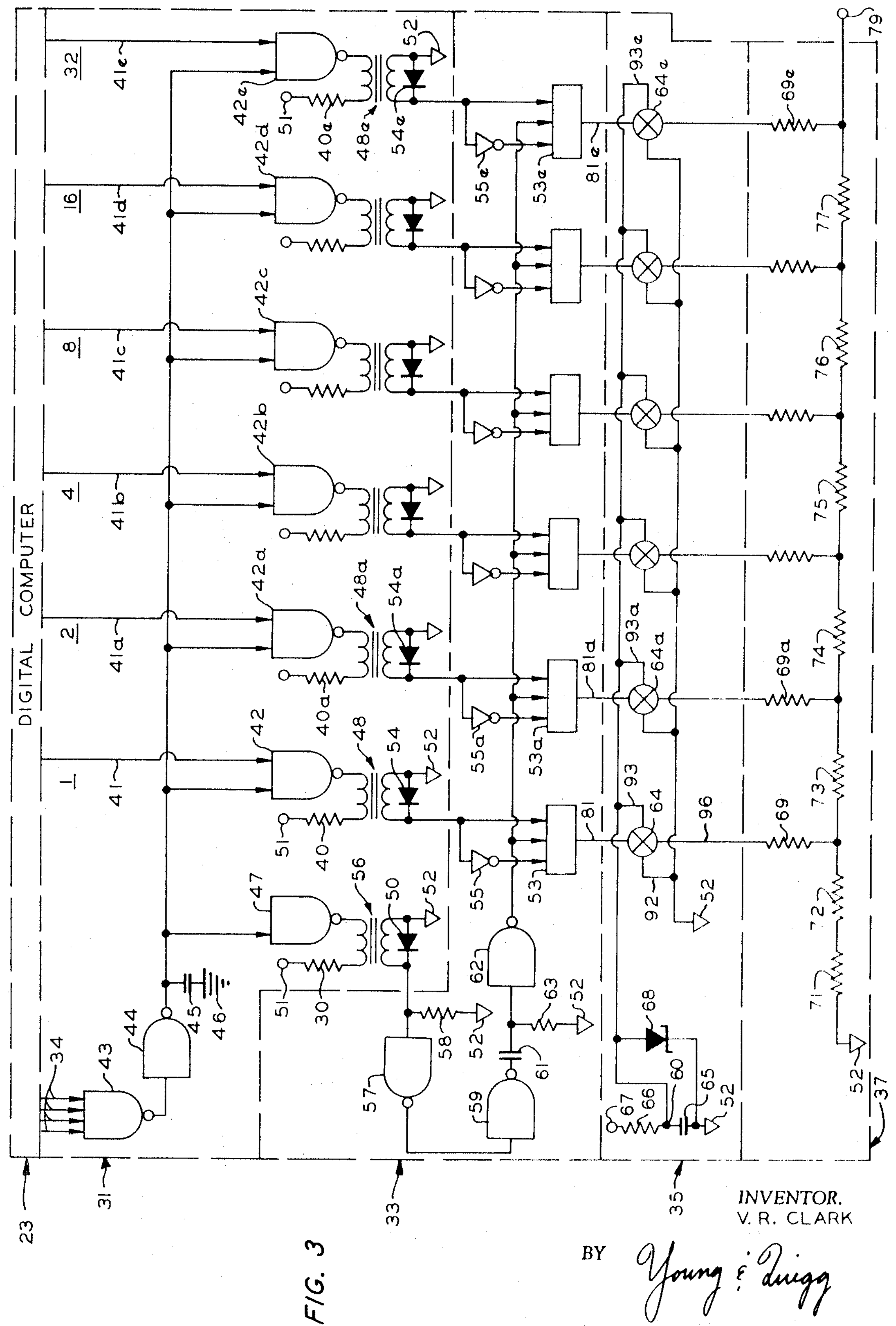
FIG. 3 is a schematic representation of the details of a digital-to-analog converter in accordance with one embodiment of the invention.

Referring now to FIG. 3, the digital signals corresponding to values of 1, 2, 4, 8, 16, and 32 are applied through lines 41, 41*a*, 41*b*, 41*c*, 41*d*, and 41*e*, respectively, to the first input of NAND-circuits 42, 42*a*, 42*b*, 42*c*, 42*d* and 42*e*, respectively. The address signal in digital form is transmitted from digital computer 23 to the inputs of NAND-circuit 43. The output of NAND-circuit 43 is connected to the input of NAND-circuit 44, the output of the latter being connected through capacitor 45 to ground 46. Ground 46 is the electrical ground of computer 23 and is represented by the conventional symbol of five parallel lines of differing lengths. This is in contrast to the ground of the digital-to-analog converter which is represented in the drawings by a triangle. The output of NAND-circuit 44 is also applied to the second input of NAND-circuits 42, 42*a*, 42*b*, 42*c*, 42*d*, and 42*e* and to the input of NAND-circuit 47. As the channels for the individual binary digits through data input gates 31, buffer register 33, and digital-to-analog switches 35 are identical, only the channel for the digit corresponding to the one value will be described. While six channels have been illustrated, any desired number can be employed. The primary coil of isolation transformer 48 is connected between the output of NAND-circuit 42 through a current-limiting resistor 40 to terminal 51. Terminal 51 represents an output terminal of the voltage supply of computer 23. Typically, the voltage at terminal 51, with respect to computer ground 46, can be on the order of 5 volts DC. One terminal of the secondary coil or transformer 48 is connected to isolated ground 52. Ground 52 represents the common electrical ground for the components of digital-to-analog converter 24 and is isolated from computer electrical ground 46. The other terminal of the secondary coil of transformer 48 is connected to one input of storage unit 53 in buffer register 33.

A diode 54 is connected between the terminals of the secondary coil of transformer 48 to clamp the backswing amplitude and to prevent any ringing of the circuit due to being slightly underdamped. Transformer 48 is preferably a very small transformer having a low power loss and having a 1:1 turns ratio. The second terminal of the secondary winding of transformer 48 is also connected through inverter 55 to a second input of storage unit 53. Transformer 48 applies a pulse signal to the input of storage unit 53 in response to the output signal of NAND circuit, while maintaining the storage unit 53 isolated from computer ground 46.

There are many advantages in having the digital-to-analog converter ground isolated from the computer ground. It eliminates variations in the level at different ground points within the converter due to variations in voltage drop between the particular ground points and the location of the basic ground point of the computer. This variation in voltage drop becomes acute when the converter is located at a significant distance from the computer such that the impedance of the ground lead between the converter and the computer becomes excessive. The ground isolation minimizes stray currents and pickup of noise generated in other parts of the system. With ground isolation, the same converter circuitry can be employed with either current-sourcing loads or current-sinking loads.

The primary coil of transformer 56 is connected between the output of NAND-circuit 47 through a current-limiting resistor 30 to terminal 51. One terminal of the secondary coil of transformer 56 is connected to isolated converter ground 52 while the other terminal of the secondary winding is connected to the input of NAND-circuit 57. A suppression diode 50 is connected between the terminals of the secondary coil of transformer 56. The input of NAND-circuit 57 is connected through resistor 58 to isolated converter ground 52. The output of NAND-circuit 57 is connected to the input of NAND-circuit 59, the output of which is connected through capacitor 61 to the input of NAND-circuit 62. The input of NAND-circuit 62 is also connected through resistor 63 to isolated converter ground 52. The output of NAND-circuit 62 is connected to the third input of storage unit 53 and to the third input of each of the other storage units **53*a* through 53*e* to enable the storage units to accept the input signals upon the occurrence of an output signal from NAND-circuit 62. Capacitor 61 and resistor 63 form a differentiation network to shorten the gate pulse to ensure that the gate is inhibited before any of the data stored in buffer storage units 53...53*e*** can be removed.

The output of storage unit 53 is connected by lead 81 to one input terminal of digital-to-analog switch 64. A second terminal switch 64 is connected by lead 92 to isolated converter ground 52, while a third terminal of switch 64 is connect by lead 93 to the junction 60 between capacitor 65 and resistor 66. The other terminal of capacitor 65 is connected to isolated converter ground 52, while the other terminal of resistor 66 is connected to terminal 67 of a source of negative DC voltage. A Zener diode 68 is connected in parallel with capacitor 65 to minimize fluctuations in the voltage applied to switch 64 from this particular network. Resistors 71 through 77 are connected in series between isolated converter ground 52 and output terminal 79 of ladder network 37. REsistor 69 is connected between the output of digital-to-analog switch 64 and the junction between resistors 72 and 73.

Referring now to FIG. 4, lead 81 connects the output of storage unit 53 to the cathode of DC blocking diode 82. The anode of diode 82 is connected through resistor 80 to the base of driver transistor 83. The emitter of transistor 83 is connected to terminal 84 which is maintained at +4.4 volts DC with respect to the isolated converter ground 52. The collector of transistor 83 is connected through resistor 85 to terminal 67 which is maintained at −15 volts DC with respect to isolated converter ground 52. The collector of transistor 83 is also connected through resistor 87 to the base of transistor 88 and through resistor 89 to the base of transistor 91. The collector of transistor 88 is connected through lead 92 to isolated converter ground 52 while the collector of transistor 91 is connected by lead 93 to the junction 60 between capacitor 65 and resistor 66 (FIG. 3). The emitters of transistors 88 and 91 are connected together and through lead 94 are connected to one end terminal of resistor 69. Driver transistor 83 converts the digital signal from buffer storage unit 53 into positive and negative drive currents for switching transistors 88 and 91, and ensures that the input signal swing is larger than the reference voltage on lead 93.

Referring now to FIG. 5, there is illustrated a DC to DC converter to provide isolation between the ground 46 of the computer power supply and the isolated ground or common 52 of the converters 24 and 26. The emitters of transistors (0) and 102 are connected to computer ground 46 while coil 103 is connected between the collectors of transistors 101 and 102. The positive terminal 104 of the computer power supply is connected to the center tap of coil 103. Coil 105 is connected between the base of transistor 102 and a first terminal of resistor 106, the other terminal of resistor 106 being connected to terminal 104. Similarly, coil 107 is connected between the base of transistor 101 and the first terminal of resistor 106. The center tap of coil 108 is connected to computer ground terminal 46 while the ends of coil 108 are connected to the cathodes of rectifying diodes 109 and 111. The anodes of diodes 109 and 111 are connected through resistor 112 to the first terminal of resistor 106. The secondary of the isolation transformer comprises center tap coils 113, 114, and 115, the center tap of each being connected to the isolated converter ground 52. The ends of coil 113 are connected to the anodes of rectifying diodes 116 and 117. The cathodes of these diodes are connected to filter 118 to terminal 119 to provide a 15-volt DC with respect to the converter isolated ground. The ends of coil 114 are connected to the anodes of diodes 121 and 122, with the cathodes of these diodes being connected together and through filter 123 to terminal 124 to provide a voltage with respect to the isolated converter ground 52 of +5 volts DC A diode 125 is connected between the output of filter 123 and terminal 84 to provide a voltage with respect to the converter isolating ground of 4.4 volts DC. In this instance, diode 125 merely serves as a voltage drop. The ends of coil 115 are connected to the cathodes of rectifying diodes 126 and 127 with the anodes of these diodes being connected together and through filter 128 to terminal 67 to provide a voltage with respect to the isolated converter ground of −15 DC. In each case, filters 118, 123, and 128 can be any suitable filter network to reduce fluctuations in the DC voltage. One suitable filter comprises a $\pi$ filter having capacitors in the two legs and an inductance in the crossmember.

Referring now to FIG. 6, the output terminal 79 of the ladder network 37 is connected to an input of operational amplifier 39 while the second input of amplifier 39 is connected to isolated converter ground 52. A zero-adjusting rheostat 132 and a resistor 133 are connected in series between terminal 60 and terminal 79. The voltage at terminal 60 (FIG. 3) serves as a reference voltage. A span-adjusting rheostat 134, resistors 135 and 136, are connected in series between terminal 79 and isolated converter ground 52. The output of amplifier 39 is connected through capacitor 137 to isolated converter ground 52 and through resistor 138 to the base of amplifying transistor 139. The collector of transistor 139 is connected to terminal 119 of the converter power supply (FIG. 5). Resistor 141 connects the emitter of transistor 139 to terminal 142. Capacitor 143 connects terminal 142 to terminal 144 at the junction of resistors 135 and 136. Capacitor 140 is connected between terminals 79 and 142. When it is desired to provide a 4 to 20 milliamp current output, the output leads can be connected to terminals 142 and 144. When it is desired to provide a 1- to 5-volt DC output, the output leads can be connected to terminal 144 and isolated converter ground 52, with a jumper 145 being connected across capacitor 143.

Figure 7:
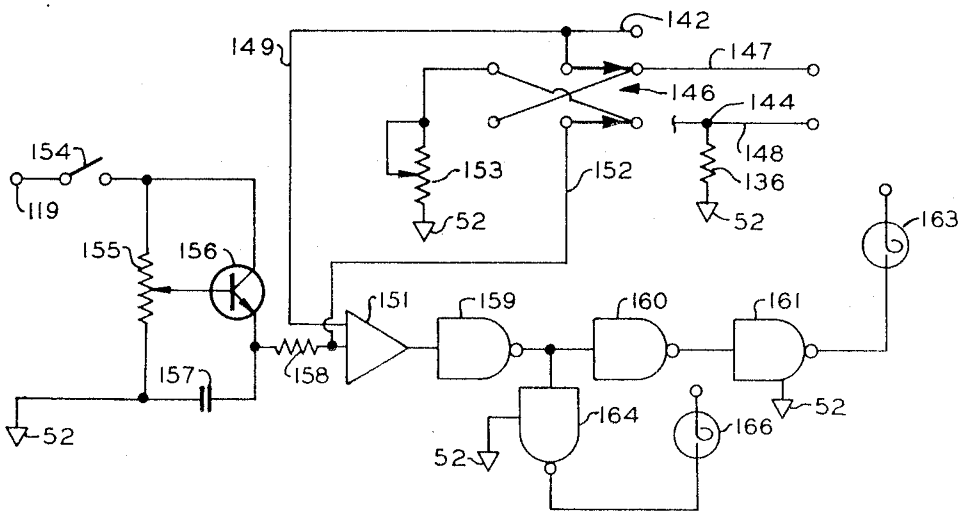
FIG. 7 is a diagrammatic representation of a control mode selection system which can be employed as a modification of the circuitry of FIG. 6.

Referring now to FIG. 7, there is illustrated a circuit for providing bumpless transfer between computer control and manual control of the analog output signal. The output terminal 142 of FIG. 6 is connected to one contactor of doublepole, double throw switch 146, with the corresponding output lead 147 being connected to one terminal of switch 146. Output lead 148 remains connected to terminal 144 of FIG. 6. Terminal 142 is also connected by lead 149 to one input of comparator 151. The second input of comparator 151 is connected to the second contactor of switch 146 by lead 152. Rheostat 153 is connected between isolated converter ground 52 and a pair of diagonally opposed terminals of switch 146. The second set of diagonally opposed terminals are connected together and to lead 147. Switch 154 and potentiometer 155 are connected in series between power terminal 119 and isolated converter ground 52. The contactor of potentiometer 155 is connected to the base of transistor 156 while the collector of transistor 156 is connected to the junction between potentiometer 155 and switch 154. The emitter of transistor 156 is connected by way of capacitor 157 to isolated converter ground 52 and by way of resistor 158 to the second input of comparator 151. NAND-circuits 159 and 160 are connected in series between the output of comparator 151 and the control input of lamp driver 161. Indicator light 163 and lamp driver 161 are connected in series between a source of positive potential and isolated ground 52. Lamp driver 164 is connected between the output of NAND-circuit 159 and the indicator light 166. Indicator light 166 and lamp driver 165 are connected in series between a source of positive potential and isolated ground 52. When computer operation of the ultimate control means is desired, switch 146 is placed in the position illustrated in FIG. 7 so that output terminal 142 is connected to output lead 147. In this condition, the output terminal 142 is connected to the first input of comparator 151 while the second input of comparator 151 is connected through resistor 158 to the emitter of transistor 156 and through lead line 152 and rheostat 153 to isolated converter ground 52. When it is desired to convert to manual control, switch 154 is closed and the contactor of potentiometer 155 is manually adjusted until the voltage at the first input to comparator 151 equals the voltage at the second input to comparator 151. When the voltage of the first input to comparator 151 is greater than the voltage at the second input, lamp 163 will be off and lamp 166 will be on. When the voltage at the second input to comparator 151 is greater than the voltage of the first input, lamp 163 will be on and lamp 166 will be off. Thus the operator manually adjusts the contactor of potentiometer 155 to the position in which both lamps 163 and 166 just change states, and the operator then manually actuates switch 146 to its second position. In the second position, output terminal 142 is connected through rheostat 153 to isolated converter ground 52 while the emitter of transistor 156 is connected through resistor 158 and lead 152 to output lead 147. The change from manual control to computer control can be accomplished in the same manner, i.e., the operator manually adjusts the contactor of potentiometer 155 until the two inputs to comparator 151 are equal, and then manually actuates switch 146 to connect output terminal 142 to output lead 147.

Figure 8:
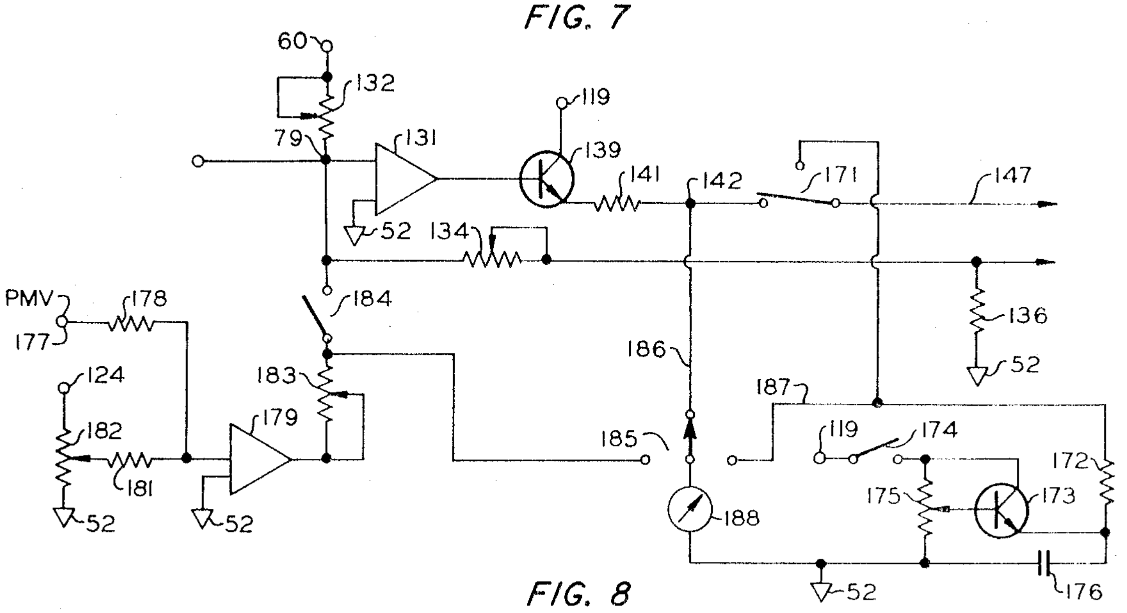
FIG. 8 is a diagrammatic representation of another control mode selection system which can be employed as a modification of the circuitry of FIG. 6.

Referring now to FIG. 8, there is illustrated a system which provides for three-mode operation: computer control, manual control, and control by an analog controller. For sake of simplicity those portions which are common to the computer control of FIG. 6 have been given the same numerical designation. The contactor of single pole, double throw switch 171 is connected to output lead 147 while one of the input terminals is connected to output terminal 142 and the other input terminal is connected through resistor 172 to the emitter of transistor 173. The collector of transistor 173 is connected through switch 174 to power terminal 119 and through potentiometer 175 to isolated converter ground 52. The contactor of potentiometer 175 is connected to the base of transistor 173, while the emitter of transistor 173 is connected through capacitor 176 to isolated converter ground 52. An analog signal representative of the measured value of the process variable being controlled is applied to terminal 177. Resistor 178 connects terminal 177 to the first input of operational amplifier 179. Resistor 181 connects the first input of summing amplifier 179 to the contactor of potentiometer 182, the ends of which are connected between power terminal 124 and isolated converter ground 52. The manipulation of the contactor of potentiometer 182 produces a manually adjustable bias signal which is subtracted from the process variable measurement signal by summing amplifier 179 due to the opposite polarity of the bias signal. The second input of amplifier 179 is connected to isolated converter ground 52. The output of amplifier 179 is connected through gain control rheostat 183 and switch 184 to terminal 79. The junction between rheostat 183 and switch 184 is connected to one terminal of three-position switch 185. Terminal 142 is connected by lead 186 to a second terminal of switch 185, while the emitter of transistor 173 is connected through resistor 172 and lead 187 to the third terminal of switch 185. The contactor of switch 185 is connected through a visual indicator to isolated converter ground 52. When a computer failure occurs, the output of the ladder network 37 remains at the value corresponding to the last computer output. If it is then desired to transfer to manual control, switch 174 is closed, and the contactor of potentiometer 175 is varied until indicator 188 shows the output of the manual control circuit to be substantially identical to the output signal at terminal 142. Switch 171 is then moved to connect output lead 147 to resistor 172. However, if it is desired to utilize the analog controller mode of operation, the contactor of potentiometer 182 is manually adjusted until the signal at the input terminal of switch 184 is substantially zero as shown by indicator 188. Switch 184 is then closed and any subsequent variations in the process variable measurement result in a correction signal which is added to or subtracted from the last computer output represented by the output of ladder network 37. In the analog controller mode of operation, switch 171 connects terminal 142 to output lead 147. This system such permits changing from any one of the three modes to either of the remaining modes of operation with substantially bumpless transfer.

Figure 9:
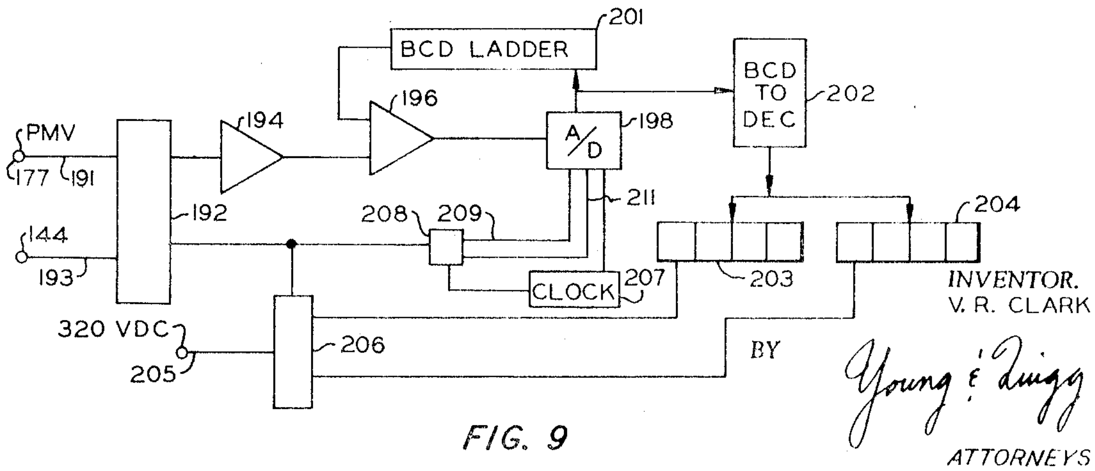
FIG. 9 is a diagrammatic representation of a visual display system for the controlled process variable measurement and the corresponding control signal.

Referring now to FIG. 9, there is illustrated a block diagram of a digital visual display system which can be connected to the output of one of the systems of FIGS. 6, 7, and 8. Lead 191 connects terminal 177 to a first input of multiplexer 192. The second lead 193 connects terminal 144 to the second input of multiplexer 192. The output of multiplexer 192 is connected to one input of amplifier 194. The output of amplifier 194 is connected to the first input of comparator 196. The output of comparator 196 is connected to the input of analog-to-digital converter 198. The digital output of converter 198 is applied to the input of binary coded decimal ladder 201 and to the input of binary coded decimal-to-decimal converter 202. The analog output of ladder 201 is applied to the second input of comparator 196. The thus-coded output signal of converter 202 is applied to the signal inputs of Nixie displays 203 and 204. High-voltage power supply terminal 205 is alternately connected to display units 203 and 204 by dual-channel driver 206. The channel selection of multiplexer 192 and the channel selection of driver 206 is controlled by clock circuit 207 and inhibit unit 208. A conversion start signal is produced by converter 198 and applied through lead 209 to a first input of inhibit unit 208 to inhibit the switching of multiplexer 192 and driver 206 during the time a conversion is being effected in converter 198. At the end of the conversion a conversion completion signal is produced by converter 198 and passed by way of lead 211 to a second input of inhibit unit 208 to provide for the passage therethrough of a clock pulse to select the alternate channel of multiplexer 192 and the alternate channel of driver 206. This system provides for the time sharing of the amplifier 194, comparator 196, analog-to-digital converter 198, ladder 201 and converter 202 while permitting the alternate operation at such a high frequency that the values are exhibited on displays 203 and 204 substantially simultaneously and appear to the operator to be continuous in nature.

Reasonable variations and modifications are possible within the scope of the foregoing disclosure, the drawings and the appended claims to the invention.

I claim:

1. Apparatus comprising a digital computer having a first electrical ground and a first electrical power supply, said computer being adapted to produce a digital output signal, said digital output signal comprising a series of voltages referenced to said first electrical ground; a plurality of isolation transformers corresponding in number to the number of said series of voltages; means for applying each of said series of voltages to the primary winding of a respective one of said isolation transformers; a second electrical ground electrically isolated from said first electrical ground; a plurality of buffer storage means corresponding in number to the number of said series of voltages; means connecting one end terminal of the secondary winding of each of said plurality of isolation transformers to said second electrical ground; means connecting the other end terminal of the secondary winding of each of said plurality of isolation transformers to the input of a respective one of said plurality of buffer storage means; a resistance ladder network having a plurality of inputs corresponding in number to the number of said series of voltages; a plurality of digital-to-analog switches, each of said switches being connected between the output of a respective one of said plurality of buffer storage element and a respective one of said plurality of inputs of said ladder network; the ground terminals of said digital-to-analog switches and of said ladder network being connected to said second electrical ground so that all of the circuitry between and including the secondary windings of said plurality of isolation transformer and said ladder network is isolated from said first electrical ground.

2. Apparatus in accordance with claim 1 further comprising an additional isolation transformer, means for applying an addressed enabling signal referenced to said first electrical ground to the primary winding of said additional isolation transformer, means connecting one end terminal of the secondary winding of said additional isolation transformer to said second electrical ground, means connected to the other end terminal of the secondary winding of said additional isolation transformer for applying a gating pulse to the gating input of each of said plurality of buffer storage means.

3. Apparatus in accordance with claim 2 further comprising a plurality of diodes, each of said diodes being connected between the end terminals of the secondary winding of a respective one of said plurality of isolation transformers and of said additional isolation transformer.

4. Apparatus in accordance with claim 1 further comprising means for amplifying the output signal from said ladder network, a second electrical power supply which produces a direct current voltage referenced to said first electrical ground, a direct current to direct current converter having a primary winding and a plurality of secondary windings, means for connecting said second electrical power supply to the input of said direct current to direct current converter, means for connecting the center of each of said plurality of secondary windings of said direct current to direct current converter to said second electrical ground, and means connecting respective output terminals of said direct current to direct current converter to the power input terminals of said digital-to-analog switches and of said means for amplifying.

5. Apparatus in accordance with claim 4 further comprising a process control element, and means for applying a signal responsive to the output of said amplifying means to said process control element.

6. Apparatus in accordance with claim 1 further comprising a process control element, means for amplifying the output of said ladder network, manually adjustable means for producing a control signal, and switching means for selectively applying a signal representative of one of said control signal and the output of said amplifying means to said process control element.

7. Apparatus in accordance with claim 1 further comprising a process control element, means for amplifying the output of said ladder network, means for producing a measurement signal representative of a process variable being regulated by said process control element, manually adjustable means for establishing a bias signal, means for subtracting said bias signal from said measurement signal, first switching means adapted to connect the output of said subtracting means to an input of said amplifying means to combine the output of said ladder network and the output of said subtracting means, said plurality of buffer storage elements and said plurality of digital-to-analog switches being adapted to maintain a constant value for the output of said ladder network in the absence of a gating signal being applied to said plurality of buffer storage elements, and means for applying a signal representative of the output of said amplifying means to said process control element.

* * * * *